United States Patent [19]
Otto

[11] Patent Number: 4,770,424
[45] Date of Patent: Sep. 13, 1988

[54] COMPACT LABYRINTH-TYPE SEAL
[75] Inventor: Dennis L. Otto, Malvern, Ohio
[73] Assignee: The Timken Company, Canton, Ohio
[21] Appl. No.: 124,813
[22] Filed: Nov. 23, 1987

Related U.S. Application Data
[63] Continuation-in-part of Ser. No. 79,175, Jul. 29, 1987, which is a continuation-in-part of Ser. No. 811,657, Dec. 19, 1985, abandoned.

[51] Int. Cl.$^4$ ............................................. F16J 15/16
[52] U.S. Cl. ..................................... 277/25; 277/134; 277/215; 277/53
[58] Field of Search ................... 277/53, 134, 25, 133, 277/212 F, 215, 37

[56] References Cited
U.S. PATENT DOCUMENTS

| | | |
|---|---|---|
| 2,277,979 | 3/1942 | Horger . |
| 2,834,616 | 5/1958 | Gebert et al. . |
| 2,856,208 | 10/1958 | Cobb .................................... 277/53 |
| 2,871,037 | 1/1959 | Johnson et al. . |
| 2,879,114 | 3/1959 | Bowen . |
| 3,021,161 | 2/1962 | Rhoads et al. . |
| 3,341,265 | 9/1967 | Paterson . |
| 3,363,952 | 1/1968 | Paterson . |
| 3,682,488 | 8/1972 | Matsushima ......................... 277/37 |
| 3,741,615 | 6/1973 | Otto . |
| 3,790,238 | 2/1974 | Otto . |
| 3,912,284 | 10/1975 | Gosling et al. ....................... 277/53 |
| 4,252,329 | 2/1981 | Messenger ........................... 277/37 |
| 4,399,998 | 8/1983 | Otto .................................... 277/134 |
| 4,522,515 | 6/1985 | Miki et al. ........................... 384/571 |
| 4,679,801 | 7/1987 | Poloni .................................. 277/53 |

Primary Examiner—Lenard A. Footland
Attorney, Agent, or Firm—Gravely, Lieder & Woodruff

[57] ABSTRACT

A seal that is suited for use in the ends of a double row bearing for front wheel drive automobiles has a seal case which is pressed into the end of the outer race for the bearing. The case carries a seal element, which is formed from an elastomer or some other flexible material, and this element cooperates with a shield that is carried by the inner race of the bearing, all to establish a barrier that retains a grease-type lubricant in the bearing and excludes water and other contaminants. The seal element actually creates three barriers along the sealing surface which has both axially and radially directed portions. The first is as a primary labyrinth which encircles the axial portion of the sealing surface and contains pumping cavities which direct lubricant that enters then back toward the interior of the bearing. The second is along a dirt lip that extends toward and contacts the axial portion of the sealing surface at an oblique angle. The third is along a secondary labyrinth which is located along the radial portion of the sealing surface and has a groove that opens toward that surface. The groove is filled with the grease-type lubricant that further spans the space between the secondary labyrinth and the radial portion of the sealing surface to prevent contaminants from entering in that region. In addition, the seal may be provided with a flinger which is located radially outwardly from the secondary labyrinth and projects axially beyond the radial portion of the sealing surface.

23 Claims, 5 Drawing Sheets

COMPACT LABYRINTH-TYPE SEAL

RELATED APPLICATION

This application is a continuation-in-part of application Ser. No. 079,175, filed July 29, 1987, which in turn is a continuation-in-part of application Ser. No. 811,657, filed Dec. 19, 1985, abandoned.

BACKGROUND OF THE INVENTION

This invention relates in general to seals and more particularly to seals that are highly compact, yet are extremely effective in retaining lubricants in and excluding contaminants from a sealed cavity.

The steering knuckles of front wheel drive automobiles carry the bearings on which the front wheels rotate, each bearing in effect being received in its steering knuckle and in turn receiving a rotatable hub to which a wheel is bolted. Little space exists in this mechanism for accommodating the bearing, and as a result the bearings for front wheel drive automobiles are highly compact. Of course such bearings require seals to retain lubricants and to exclude contaminants, and to achieve an effective spread, that is sufficient spacing between the two rows of rolling elements in the bearing, the seals must occupy as little space as possible. Typically the seals are fitted into the ends of the bearing where they also serve to unitize the bearing for handling purposes.

Sometimes a secondary seal is installed between the knuckle and the hub to provide an extra measure of protection, particularly beyond the main seal at the inboard end of the bearing, but if the secondary seal does not establish an effective barrier, it can be a detriment that diminishes the life of the bearing. For example, if the secondary seal is of poor quality, or is damaged, or is around a poor quality mating surface, it will allow contaminants such as water to work into the space between it and the main seal and indeed will trap contaminants in that space. These contaminants eventually destroy the main seal and the bearing which the main seal is designed to protect. Thus, an ineffective secondary seal is worse than no secondary seal at all.

Aside from the potentially destructive effects that a secondary seal may have, a secondary seal constitutes still another part in an already complicated assembly and requires machined surfaces where it is mounted and at the mating surface against which it bears. This, of course, adds to the cost of the front wheel drive assembly.

A typical front wheel bearing for front wheel drive automobiles is supplied as a unit and includes a unitary outer race, which at its ends receives and holds the seals for the bearing. These seals bear against the inner race. The seals of the present invention when installed at the ends of a bearing for a front wheel drive automobile establishes extremely effective barriers-ones that need not be supplemented by secondary seals. Moreover, they create only minimal drag and thus require little torque. The seals not only prevent the lubricant that is within the bearing from escaping, but actually pump the lubricant back into the interior of the bearing.

DESCRIPTION OF THE DRAWINGS

In the accompanying drawings which form part of the specification and wherein like numerals and letters refer to like parts wherever they occur.

DETAILED DESCRIPTION

Figure 1:
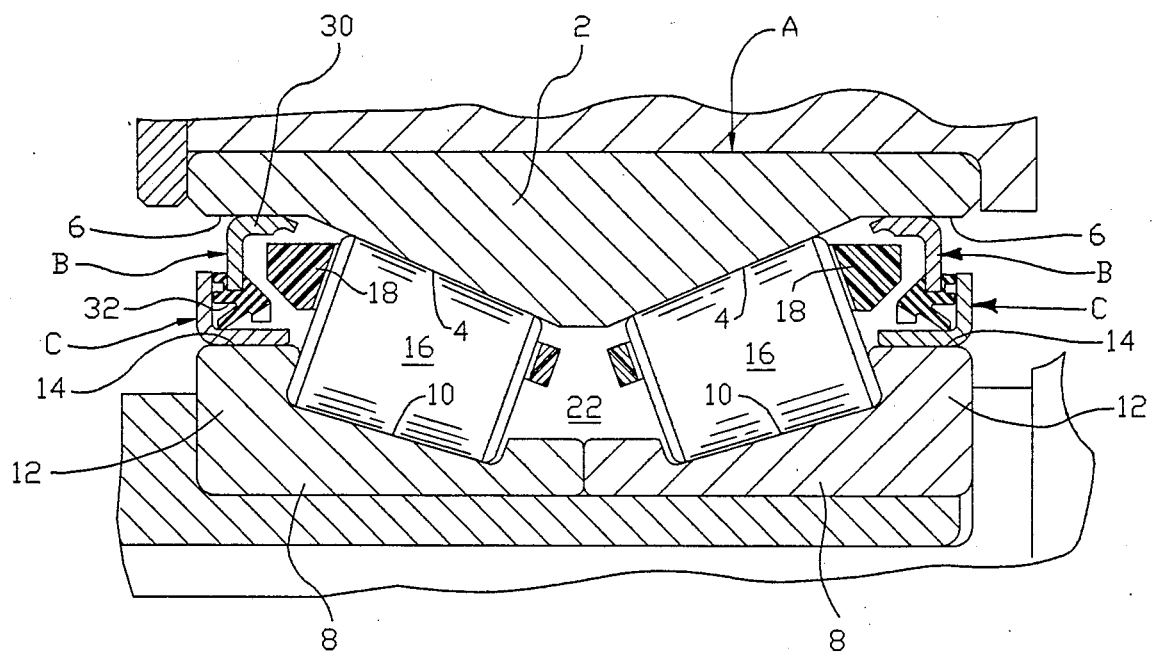
FIG. 1 is a partial sectional view of a bearing containing seals and cooperating shields constructed in accordance with and embodying the present invention.

Referring now to the drawings, a double row tapered roller bearing A (FIG. 1) is at each of its ends closed by a seal B and a cooperating shield C, both of which are received in the end of the bearing A where they serve to unitize the bearing A in the sense that they hold the components of the bearing A together, thus enabling the bearing A to be handled without falling apart. The bearing A is highly compact, yet possesses the large load-carrying capacity and the durability which are characteristic of tapered roller bearings. As such, the bearing A is suited for use in the front wheels of front wheel drive automobiles.

The bearing A includes (FIG. 1) a double cup 2 having a pair of inwardly presented raceways 4 and at the large diameter ends of those raceways 4, cylindrical counterbores 6 which run out to the ends of the cup 2. It is across these ends that the cup 2 is clamped in a supporting structure such as the steering knuckle of an automotive suspension system. The cup 2 surrounds a pair of cones 8 which abut midway between the ends of the cup 2, which is where the cup raceways 4 are smallest, and each cone 8 has a tapered raceway 10 which faces and indeed is encircled by one of the cup raceways 4. Each cone raceway 10 leads out to a thrust rib 12 having a cylindrical outwardly presented surface 14 of greater diameter, and that surface in turn leads out to that end of the cone 8 known as the cone back face. The thrust rib 12 forms an integral part of the cone 8, and its cylindrical surface 14 lies within the counterbore 6 at the corresponding end of the cup 2. The two cones 8 are clamped together in another structure which may be a hub that is within the steering knuckle of a front wheel drive automobile.

In addition to the double cup 2 and the two cones 8, the bearing A has tapered rollers 16 (FIG. 1) which are arranged in two rows corresponding to the sets of opposed raceways 4 and 10 on the cup 2 and cones 8. Thus, a separate row of rollers 16 surrounds each cone 8. Along their large end faces the rollers 16 abut against the thrust rib 12 for their respective cones 8, so that the thrust ribs 12 prevent the rollers 16 from being expelled from the spaces between the raceways 4 and 10 when the bearing is subjected to radial loads. Each row of rollers 16 contains a cage 18 which maintains the proper spacing between adjacent rollers 16, and further holds the rollers 16 around its cone 8 when the cone 8 is removed from the cup 2. Each cage 18 has a large end ring which extends across the large end faces of the rollers 16 and in so doing projects into the counterbore 6 at the corresponding end of the cup 2, or more accurately into the annular space between the surface of the counterbore 6 and the cylindrical sealing surface 14 on the thrust rib 12 of the cone 8. The tapered rollers 16 of the rows and the cages 18 for those rollers 16 move within a sealed or isolated annular cavity 22 which is closed at its ends by the seals B and shields C.

The cup 2 and cones 8 are concentric about the axis x of rotation for the bearing A, and in the operation of a typical front wheel drive bearing, the cup 2 is stationary while the cones 8 revolve within the cup 2. In so doing the tapered rollers 16 in the two rows move along the raceways 4 and 10, and to reduce friction, particularly between the large end faces of the rollers 16 and the thrust rib 12 of the two cones 8, a supply of grease-type lubricant exists within the annular cavity 22. Indeed, the tapered rollers 16 tend to pump the lubricant toward the thrust rib 12. The seals B and shields C generally occupy the annular spaces between the surfaces of the cup counterbores 6 and the cylindrical surfaces 14 of cone thrust ribs 12 and prevent the lubricant from escaping. The seals B together with the shields C further exclude dust, water and other contaminants from the interior of the bearing A. Thus, the seals B and shields C serve to isolate the annular cavity 22 (FIG. 1) that exists between the cup 2, on one hand, and the two cones 8, on the other. Since the cavity 22 contains the tapered rollers 16, it experiences wide variations in temperature, but these variations do not significantly affect the pressure within the cavity 22, because the seals B further vent the cavity 22.

Figure 2:
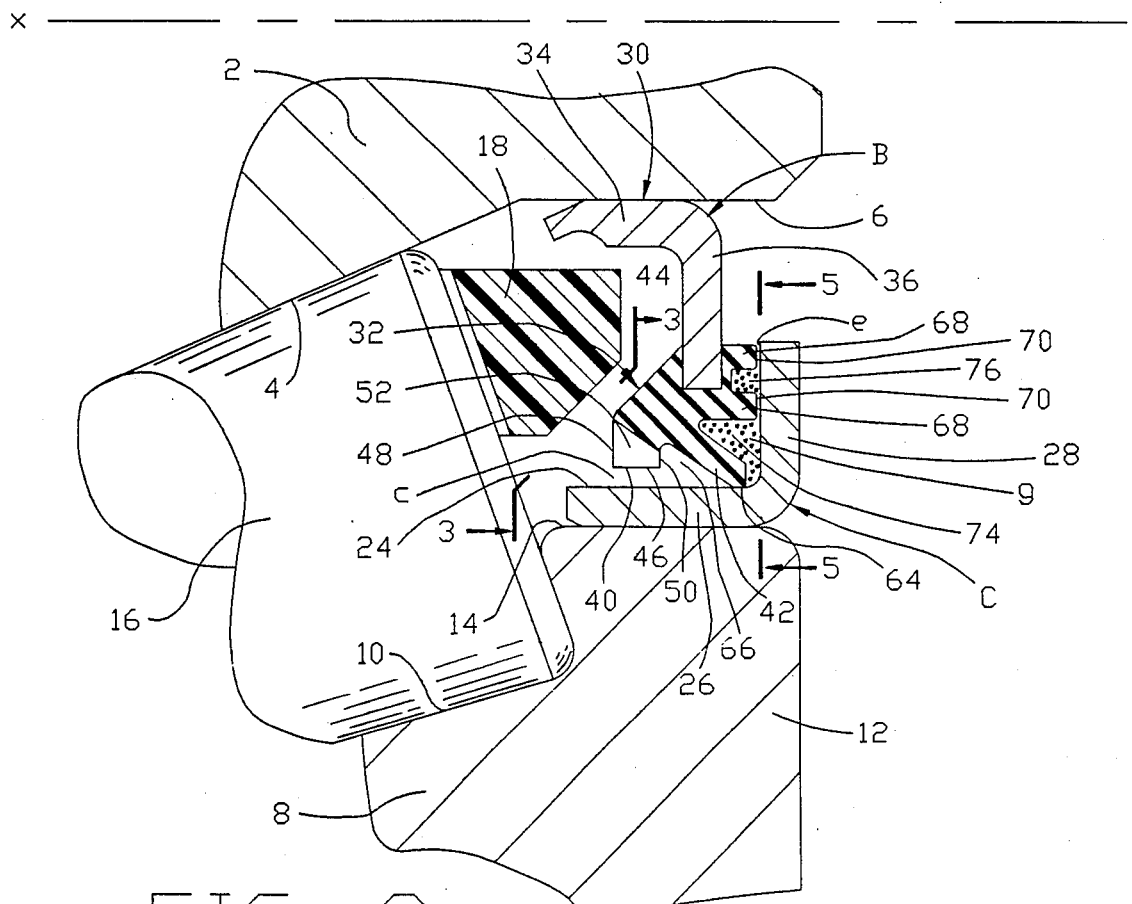
FIG. 2 is an enlarged sectional view of the seal and cooperating shield that forms the present invention, as well as the surrounding regions of the bearing.

Considering the shields C first, they are fitted over the thrust ribs 12 on the cones 8 where they provide sealing surfaces 24 with which the seals B cooperate to establish barriers at the ends of the annular cavity 22. To this end, each shield C constitutes nothing more than a metal stamping consisting of an axial mounting portion 26 and a flange 28 which projects radially outwardly from one end of the axial portion 26. The sealing surface 24 for the shield C lies along both the axial portion 26 and the flange 28 (FIG. 2). The axial portion 26 is pressed over the thrust rib 12 of the cone 8 so that an interference fit exists between it and the surface 14 of the thrust rib 12. The flange 28 lies flush with or is set slightly inwardly from the back face of the cone 8. It exists within the counterbore 6 of the cup 2, but does not project radially outwardly enough to actually contact the cup 2.

Each seal B includes (FIG. 2) a metal seal case 30 and an elastomeric sealing element 32 which is bonded to the seal case 30. The case 30, which serves as a mount for the elastomeric sealing element 32, has an axial portion 34 which is cylindrical and fits into the cup counterbore 6 at one end of the bearing A, there being an interference fit between the cylindrical surface of the bore 6 and the axial portion 34, so that the seal B remains firmly in place within the cup 2. The intereference fit further establishes a static seal along the surface of the counterbore 6. In addition, the seal case 30 has a radial portion 36 which is formed integral with the axial portion 34 and projects radially inwardly from one end of the axial portion 34, it being offset axially with respect to the flange 28 of the shield C so as not to interfere with the shield C. Indeed, the radial portion 36 projects toward the axial portion 26 of the shield C, but enough space exists between it and both the axial and radial portions 26 and 28 of the shield C to accommodate the elastomeric sealing element 32.

The elastomeric sealing element 32 is bonded to the seal case 30 along the inner edge of the radial portion 36 and also along the two faces of the radial portion 36 immediately beyond that edge (FIG. 2). From its point of attachment the sealing element 32 projects generally toward the sealed cavity 22 as well as toward the axial and radial portions 26 and 28 of the shield C to effect a live or dynamic seal with respect to the sealing surface 24 of the shield C. In so doing it provides within the sealed cavity 22 an annular space into which the large end ring at the end of the cage 18 projects, and this ring of course revolves in the space when the cone 8 turns within the cup 2 or vice-versa.

More specifically, the sealing element 32 is configured to establish three barriers along the sealing surface 24 of the shield C. The first barrier exists along a primary labyrinth 40 which is presented toward and exposed to the sealed cavity 22 (FIG. 2). It surrounds the axial portion 26 of the shield C, yet is spaced from the sealing surface 24 on the axial portion 26. The second barrier constitutes a dirt lip 42 which is directed obliquely away from the labyrinth 40 and actually contacts the sealing surface 24 along the axial portion 26 of the shield C. The third barrier takes the form of a secondary labyrinth 44 which projects toward, yet is spaced from, the segment of the sealing surface 24 that is on the flange 28 of the shield C. The secondary labyrinth 44 and the dirt lip 42 exist on the air side of the seal B and their primary purpose is to exclude contaminants, such as water, dirt and dust, from the sealed cavity 22. The primary labyrinth 40 exists on the lubricant side of the seal B and its primary purpose is to retain the lubricant within the cavity 22.

Figure 3:
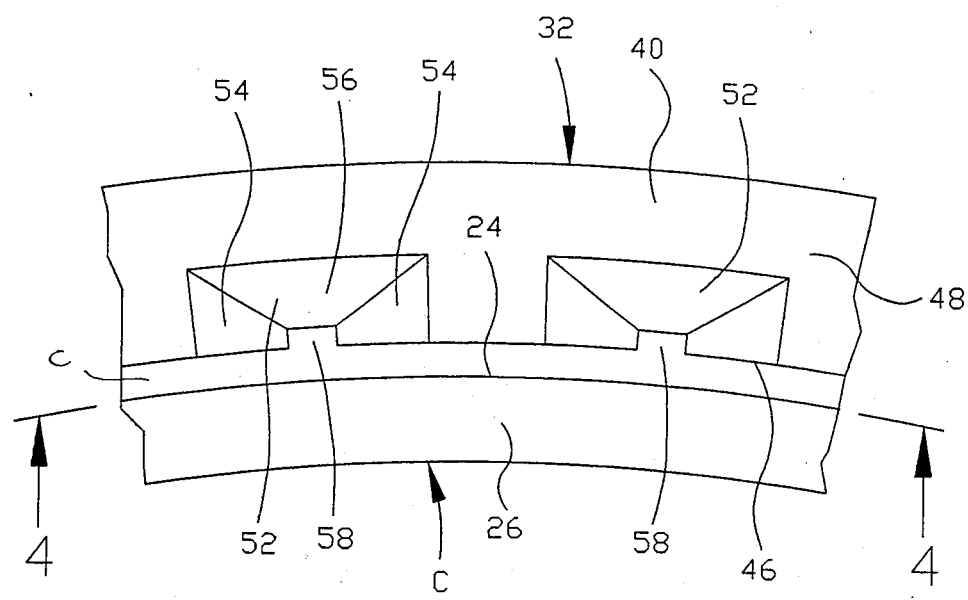
FIG. 3 is a partial end view of the seal and shield taken along line 3—3 of FIG. 2.
Figure 4:
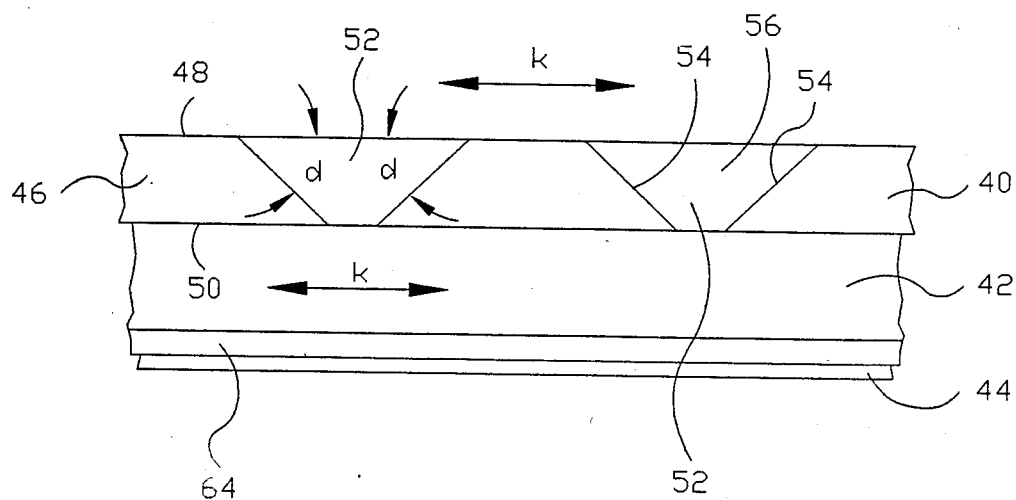
FIG. 4 is a view taken along line 4—4 of FIG. 3 and showing the underside of the primary labyrinth, that is the face of the labyrinth which is presented toward the sealing surface on the shield.

Considering the primary labyrinth 40 first (FIGS. 2-4), it turns radially inwardly and terminates at a circumferential or cylindrical face 46 which is presented toward, but is slightly greater in diameter than, the outer cylindrical sealing surface 24 on the axial portion 26 of the shield C. As a consequence, a slight clearance c exists between the sealing surface 24 and the face 46, and this clearance typically could range between 0.002 and 0.064 inches, this being a working clearance since some eccentricity between the labyrinth 40 and sealing surface 24 as the result of manufacturing tolerances may exist. On one side of the cylindrical surface 46 is an inner end face 48 which is presented toward the sealed cavity 22 and on the other side an outer end face 50 which is presented toward the secondary lip 42. Both faces are radial, that is they lie in planes which are perpendicular to the bearing axis x, and hence they are parallel to each other. Neither the cylindrical face 46 nor the inner end face 48 is continuous, but instead both are interrupted by small pockets or cavities 52 which are configured to pump or impell any lubricant that enters them back toward the tapered rollers 16, that is back into the sealed cavity 22. The cavities 52 are arranged at equal circumferential intervals along the primary labyrinth 40, with each cavity 52 opening out of both the cylindrical face 46 and the inner end face 48 of the primary labyrinth 40 and interrupting the edge at which those faces intersect. To effect the pumping or impelling action, each cavity 44 has a pair of side faces 54 (FIGS. 3 & 4) which are located at equal angles d with respect to the direction of relative rotation k between the labyrinth 40 and the sealing surface 24. The angle d should be between 30° and 60° and should preferably be 45°. Thus, the side faces 54 intersect the cylindrical face 46 along lines which are oblique to the direction of relative rotation k between the primary labyrinth 40 and sealing surface 24, which is, of course, the circumferential direction. Completing the cavity 44 is an outside connecting face 56 which extends between the two side faces 46 and is oriented at an oblique angle with respect to the cylindrical sealing surface 24, it being farthest from the cylindrical surface 24 at the inner end face 48. The two side faces 54 are planar, while the connecting face 56 may be planar or perhaps slightly concave. All three of the faces 54 and 56 intersect the outer end face 50, with the lines of intersection for the side faces 54 being spaced slightly apart and the line of intersection for the connecting face 56 being outwardly from the cylindrical face 46. The result is a small vent aperture 58 (FIG. 3) that opens out of the outer end face 50 toward the dirt lip 42, that aperture of course being at the small end of the pumping cavity 52.

When the cone 8 rotates, lubricant that is between the sealing surface 24 on the axial portion 26 of the shield C and the cylindrical face 46 of the primary labyrinth 40 migrates into the pumping cavities 52 where it is deflected axially by the side faces 54. Actually, the rotation of the cone 8 not only causes the lubricant to flow into each cavity 52, but further causes it to come against one side face 54 of each cavity 52, and that side face 54, being at the angle d with respect to the direction of relative rotation k, which is of course the circumferential direction, deflects the lubricant back toward the sealed cavity 22 and the tapered rollers 16 within it. The outside face 56, inasmuch as it is oblique to the axis x, also deflects lubricant back toward the sealed cavity 22 and allows lubricant, when subjected to the centrifugal forces generated by relative rotation between the cup 2 and cone 8, to flow outwardly away from the axis x of rotation as the lubricant moves into the sealed cavity 22. By reason of their wedge-shaped configurations, the pumping cavities 52 will deflect the lubricant in the same axial direction, irrespective of the direction that the cone 8 rotates, and also irrespective of whether the cone 8 or cup 2 is the rotating race of the bearing A. In this regard, in one direction of rotation one side face 54 and the outside face 56 of each cavity 52 will deflect the lubricant back toward the sealed cavity 22 that represents the interior of the bearing A, and in the other direction of rotation, the other side face 54 and outside face 56 will likewise deflect the lubricant, again axially back toward the sealed cavity 22. The vent apertures 58 at the ends of the cavities 52 along with the clearance c between the cylindrical face 46 and the axial portion 24 of the shield C prevent the sealed cavity 22 from experiencing an increase in pressure.

The dirt lip 42 (FIG. 2) projects generally away from the primary labyrinth 40 and toward the exterior of the bearing A, it having parallel side faces, a short end face and a contact face 64. The inside of the two side faces merges into the outer end face 50 of the primary labyrinth 40 at a fillet, and as a consequence a narrow annular space 66 exists between the labyrinth 40 and the lip 42. When the dirt lip 42 is undistorted, its contact face 64 has a diameter somewhat less than that of the cylindrical face 46 and also less than that of the sealing surface 24 on the axial portion 26 of shield C, so that when the seal B is on the bearing A, the dirt lip 42 is deflected slightly outwardly with its contact face 64 bearing against the sealing surface 24 on the axial portion 26 for the full circumference of that surface. Thus, in contrast to the primary labyrinth 40, some friction develops between the dirt lip 42 and the sealing surface 24, but that friction is small due to the small area of contact and the seepage of a small amount of lubricant past the primary labyrinth 40 and into the region of contact at the contact face 64, particularly when the bearing B is at rest.

Figure 5:
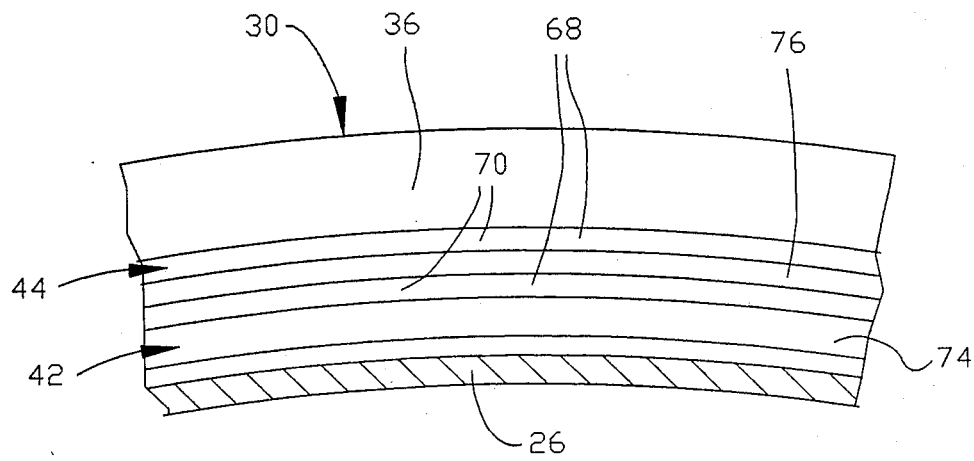
FIG. 5 is a fragmentary end view of the seal taken along line 5—5 of FIG. 2.

The secondary labyrinth 44 consists of two concentric ribs 68 (FIGS. 2 & 5) which project axially toward the flange 28 of the shield C, yet do not contact the sealing surface 24 on that flange 28. Each rib 68 has cylindrical side faces that share a common center in the axes x and a squared off end face 70. Indeed, the end faces 70 of the two ribs 68 lie in a common plane that is perpendicular to the axis x. The end faces 70 are spaced from the sealing surface 24 of the flange 28 for the shield C there being another clearance e between the two. The clearance e should range between about 0.005 and 0.026 inches. The spaced apart ribs 68 create two additional grooves in the elastomeric sealing element 32, there being one groove 74 between the dirt lip 42 and the inner of the two ribs 68 and another groove 76 between the two ribs 68 themselves. The groove 74 possesses a V-shaped cross-section, whereas the groove 76 has a rectangular cross-section.

The bearing A is furnished as a unit ready to install in an automobile steering knuckle or some other appliance, that is, with its own supply of lubricant in the sealed cavity 22 and the seals B and shields C in place. Indeed, the seals B and shields C serve to unitize the bearing A for handling purposes, in that they prevent the rollers 16 and cones 8 from coming axially out of the ends of the unitary double cup 2. The bearing A is assembled merely by inserting the two cone assemblies, that is, the cones 8 together with their rollers 16 and cages 18, into the ends of the cup 2 until the front faces of the two cones 8 abut at the center of cup 2, but before doing so the interior of the cup 2 and the two cone assemblies are loaded with a suitable grease-type lubricant. With the cones 8 so positioned, the rollers 16 seat against the raceways 4 and 10 of the cup 2 and cones 8. The seals B and shields C are installed as units into the ends of th bearing A. More specifically, each seal B and its shield C are brought together into the relative positions which they assume in the bearing A, that is the dirt lip 42 of the seal B is expanded to a diameter great enough to fit around the axial portion 26 of the shield C and then the seal B and shield C are moved together so that the lip 42 of the former actually embraces the segment of the sealing surface 24 located along the axial portion 26 of the latter. The expansion may be achieved by running the lip 42 over a tapered mandrel that leads up to the axial portion 26 of the shield C. With the seal B and shield C so coupled, the two are pressed as a unit into the end of the bearing B, that is to say, the axial portion 34 of the seal case 30 is pressed into the counterbore 6 at one end of the cup 2, while the axial portion 26 of the shield C is simultaneously pressed over the thrust rib 12 of that cone 8 which is within the counterbore 6. The force by which the installation is effected is applied through a punch which bears against the radial portion 36 of the seal case 30 for the seal B and the flange 28 for the shield C. The offset between the surfaces of the punch which bear against the seal case 30 and shield C is such that the seal B and shield C are installed with the proper axial spacing between the end faces 70 on the ribs 68 of the secondary labyrinth 44 and the segment of the sealing surface 24 that is on the flange 28 of the shield C.

When the bearing B is placed in operation, the cones 8 rotate relative to the cup 2 or vice-versa. As a consequence, the tapered rollers 16 tend to pump some of the lubricant toward the thrust ribs 12 of the two cones 8 and over the sealing surfaces 24 on the axial portions 26 for the shields C that are on those ribs 12. This lubricant, encounters the primary labyrinth 40 of each seal B, and when not in excessive quantities, is for the most part returned toward the tapered rollers 16 and the annular cavity 22 in which they revolve. In particular, upon migrating along the sealing surface 24 on the axial portion 26 of the shield C for either cone 8, the lubricant becomes caught in the pumping cavities 52 of the primary labyrinth 40 for the seal B at that end of the bearing A, and here the side faces 54 of the cavities 52, inasmuch as they are oblique to the direction of relative rotation between the sealing surface 24 and primary labyrinth 40, drive the lubricant axially and radially back toward the sealed cavity 22. The connecting faces 56, which are oblique to the axis x, likewise impel the lubricant axially. When the cones 8 constitute the rotating races of the bearing B, the centrifugal force developed tends to fling the lubricant out into the pumping cavities 52, but even when the cup 2 is the rotating component, the surface tension between the cylindrical face 46 of the primary labyrinth 40 and the lubricant is enough to cause the lubricant to be caught up in the pumping cavities 52 and to be deflected or impelled axially and radially by the faces 54 and 56 of them.

A very small quantity of the lubricant works its way under the cylindrical face 46 of the primary labyrinth 40, or perhaps through the vent apertures 58 in that labyrinth, and passes on to the contact face 64 of the dust lip 42 to reduce the friction between that face and the wear surface 24 on the axial portion 26 on the shield C. The dirt lip 42 serves primarily to exclude dust, moisture, and other contaminants from the sealed cavity 22, so that the raceways 4 and 10 and the rollers 16 in that cavity are not damaged by such contaminants. In addition the dirt lip 42 creates a back pressure when lubricant migrates into the area under the cylindrical face 46 of the primary labyrinth 40. This back pressure minimizes the amount of lubricant that can enter this area and forces some of the lubricant into engagement with the pumping cavities 52, resulting in the return of the lubricant to the sealed cavity 22. During starts and stops in operation and also when the speed of rotation is so slow that the pumping cavities 52 are ineffective in returning the lubricant to sealed cavity 22, the annular space 66 adjacent to dirt lip 42 is partially filled with lubricant which provides lubrication to contact face 64 of the lip 42 when the speed of rotation increases.

The grease-type lubricant also exists in the two grooves 74 and 76 at the secondary labyrinth 44, and indeed the lubricant in this region actually spans the space between the secondary labyrinth 44 and the portion of the sealing surface 24 that lies along the flange 28, adhering to the latter better than the former. Thus, when the shield C rotates relative to the seal B or vice-versa, the lubricant tends to remain with the flange 28 of the shield C and slips over the smooth surfaces on the secondary labyrinth 44 of the seal B. This lubricant presents a barrier g to the passage of contaminants along the sealing surface 28 and indeed prevents many contaminants from reaching the dirt lip 42 where a more positive barrier exists. Contaminants, particularly dirt, becomes entrained in the grease that is along the secondary labyrinth 44, and this dirt causes the grease to adhere even more effectively to the flange 28 of the shield C, yet does not significantly reduce its ability to slide circumferentially over the labyrinth 44.

The grease-type lubricant that enhances the barrier g along the secondary labyrinth 44 may be applied to that labyrinth before the seal B is fitted over its shield C. On the other hand, it may be acquired from within the annular cavity 22. In this regard, if excessive lubricant is placed within the bearing A during assembly of the bearing A, the tapered rollers 16 during the initial operation of the bearing A will force some of the lubricant through the space between the primary labyrinth 40 and the sealing surface 24, notwithstanding the pumping cavities 52, and indeed will exert enough force to lift the dirt lip 42 away from the sealing surface 24 and extrude the excessive lubricant into the space between the secondary labyrinth 44 and the flange 28 of the shield C. The excessive lubricant occupies the grooves 74 and 76 and spans the space between the secondary labyrinth 44 and the portion of the sealing surface 24 that is on the flange 28 to form the barrier g.

Should the pressure within the sealed cavity 22 increase during normal operation of the bearing A, this increase in pressure will be transmitted through the clearance c and through the vent apertures 58 into the annular space 66 between the labyrinth 40 and the dirt lip 42, and if great enough will lift the dirt lip 42 slightly to release the pressure. The air which is so released displaces some of the lubricant at the secondary labyrinth 44 to complete the venting, but that lubricant immediately resumes its original configuration and reestablishes the grease barrier g at the secondary labyrinth 44. Thus, the pressure within the sealed cavity 22 never becomes great enough to damage the seal B or to dislodge it.

Figure 6:
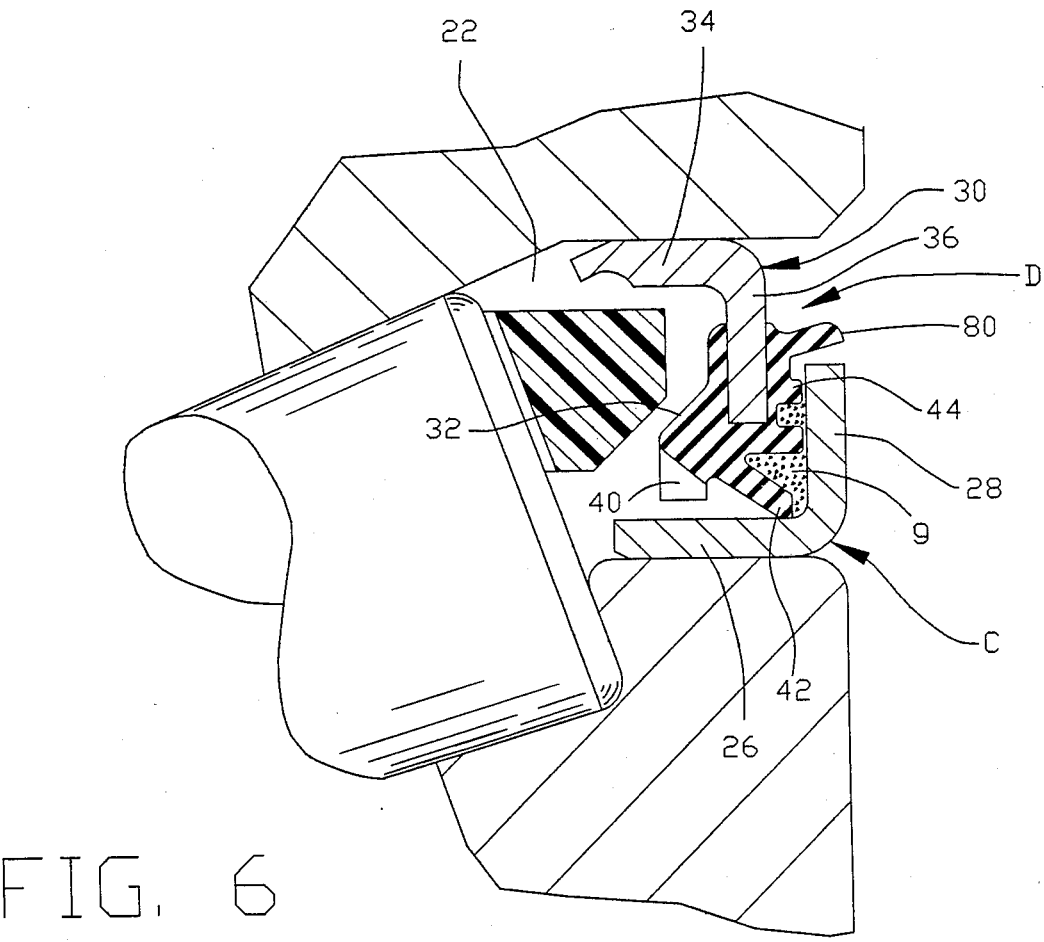
FIG. 6 is an enlarged sectional view of a modified seal and cooperating shield along with the surrounding regions of the bearing.

The seal B is best suited for use in an installation where the cup 2 remains stationary and the cones 2 rotate, because the rotation of the cones 8 is imparted to the shield C, the flange 28 of which serves as a flinger for throwing contaminants away from elastomeric sealing element 32. Where the cup 2 rotates and the cones 8 remain stationary, a modified seal D (FIG. 6) is better suited for the bearing A. The modified seal D likewise cooperates with a shield C to isolate the annular cavity 22 within the bearing A, and is virtually identical to the seal B, except for the presence of a flinger The flinger 80 is molded integral with and forms part of the elastomeric sealing element 32. It projects axially from the radial portion 26 of the seal case 30 and encircles the outer edge of the flange 28 for shield C, but it does not contact the shield C. Indeed, the flinger 80 is oriented somewhat obliquely with respect to the flange 28 so that its free outer end lies farther from the axis x of rotation than its secured inner end. Thus, any water which falls onto the upwardly presented surface of the flinger 80 while the bearing B is at rest will drain toward the flange 28 and thence downwardly off of the flinger 80, and accordingly, the flinger 80 directs water away from the secondary labyrinth 44. On the other hand, when the bearing A is in operation, the rotation of the cup 2 is of course imparted to the flinger 80 and any contaminants that come against the flinger 80 are, owing to the centrifugal forces that are generated, hurled outwardly away from the flinger 80 and the enclosure 44 which lies inwardly from it.

Figure 7:
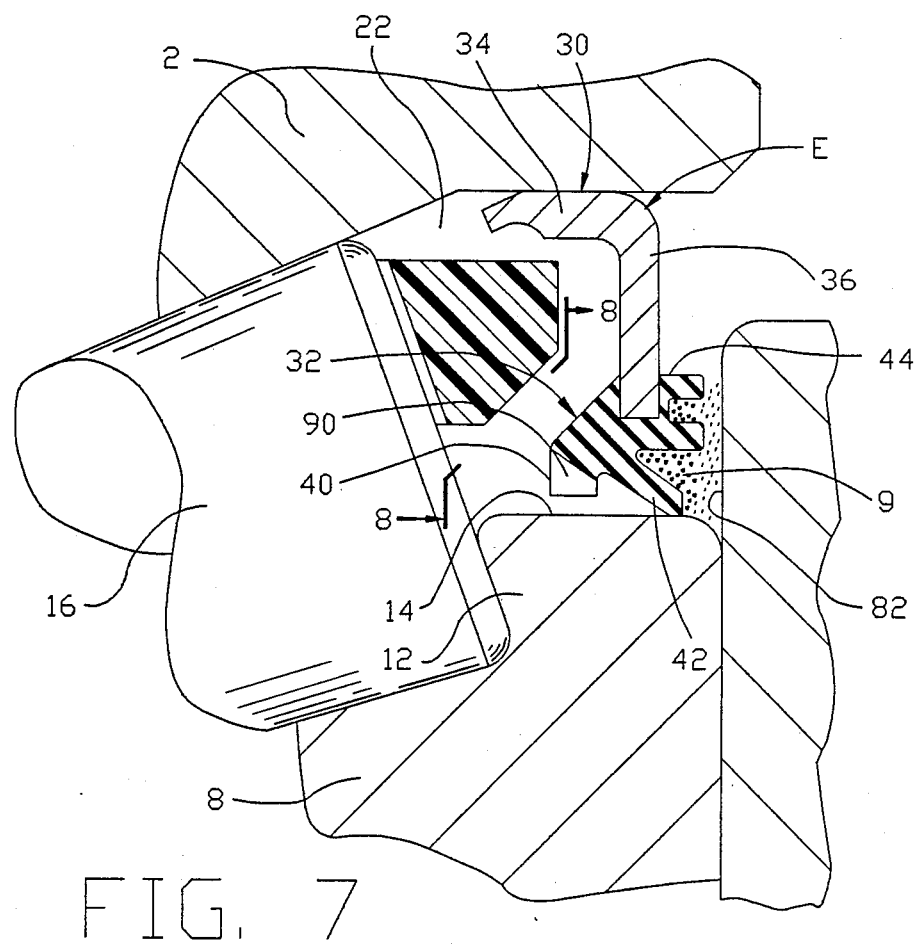
FIG. 7 is an enlarged sectional view of the seal in a modified environment that does not require the shield.

Still another seal E (FIG. 7) is identical to the seal B, but it does not establish a barrier along the shield C. Instead it establishes the barrier along machined surfaces that lead away from the annular cavity 22. In this regard, the cylindrical surface 14 for the thrust rib 12 on the cone 8, is exposed so that the lubricant from the cavity 22 migrates along it. The primary labyrinth enclosure 40 encircles the surface 14 and the cavity 52 within the enclosure 40 pumps the lubricant back toward the cavity 22. Moreover, the dirt lip 42 actually contacts the surface 14 to effect its barrier to the passage of contaminants at that surface.

The back face of the cone 8, that is the radial face on the end of the thrust rib 12, abuts a machined auxilliary surface or shoulder 82, which is fixed in position with respect to the cone 8. The shoulder 82 extends radially outwardly past the secondary labyrinth enclosure 44, its surface being spaced from the end faces 70 of the ribs 68 so that a clearance e equivalent to the clearance e for the seal B exists between the faces 70 and shoulder 82.

Thus, with the seal E, the cylindrical surface 14 of the cone thrust rib 12 serves the same purpose as the sealing surface 24 on the axial portion 26 of the shield C, while the shoulder 82 functions the same as the portion of the sealing surface 24 on the flange 28 of the shield C.

The sealing element 32 on any one of the seals B, D or E may be molded from a somewhat flexible polymer in lieu of an elastomer. Moreover, the primary and secondary labyrinths 40 and 44 may be formed from metal or some other rigid substance, with the dirt lip 42 bonded to it. The dirt lip 42 would in that case be formed from an elastomer or a polymer and would remain somewhat flexible.

Figure 8:
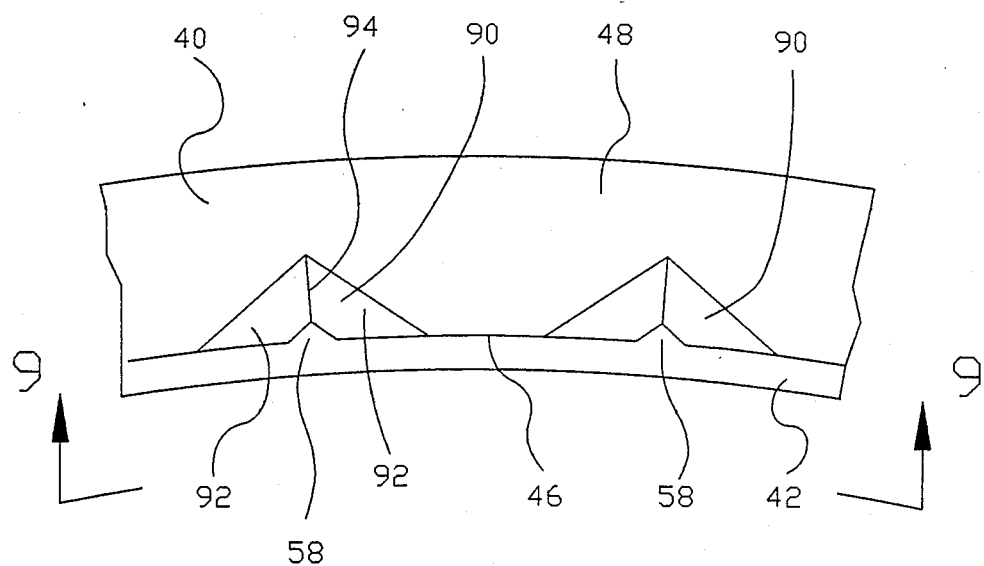
FIG. 8 is an end view of a primary labyrinth taken along line 8—8 of FIG. 7 and showing modified pumping cavities.
Figure 9:
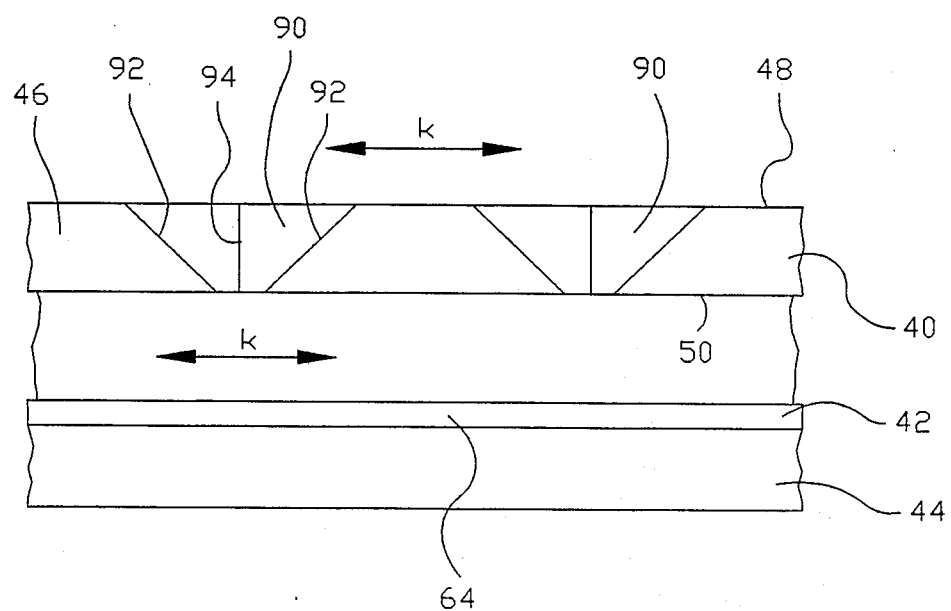
FIG. 9 is a view of the modified primary labyrinth taken along 9—9 of FIG. 8.

Each of the seals B, D and E, in lieu of having pumping cavities 52, dilineated by two side faces 54 and a single connecting face 56 each, within its primary labyrinth 40, may have within that labyrinth pumping cavities 90 (FIGS. 8 & 9) that are enclosed merely by two intersecting side faces 92, each of which is oblique to the cylindrical face 46 where it intersects that face and also oblique to the plane of the inner end face 48. As such the two side faces 92 for each cavity 90 intersect at a line 94 that is oblique to the axis of rotation, and impart to the cavity 90 a generally wedge-shaped cross-sectional configuration. Lubricant upon entering the cavities 90 is impelled axially and radially away from the primary labyrinth 40, and thus is returned to the annular cavity 22.

While the seals B, D, and E are depicted in the ends of the bearing A, they may also be installed in a housing that contains the bearing A. Indeed, they need not be used with antifriction bearings at all.

This invention is intended to cover all changes and modifications of the example of the invention herein chosen for purposes of the disclosure which do not constitute departures from the spirit and scope of the invention.

What is claimed is:

1. In combination with a sealing surface of circular cross-sectional configuration and a component located generally around the surface and arranged such that relative rotation about an axis of rotation may occur between the sealing surface and the component, an improved seal for isolating within the component a region that contains a lubricant, said seal comprising: a generally rigid seal case attached to the component such that a static barrier exists between the component and the seal case and a sealing element attached to the case and encircling the sealing surface to form a barrier along the sealing surface, the sealing element including: a first labyrinth exposed to the isolated region and having a circumferentially extending face which is presented toward the sealing surface and an end face which is presented toward the isolated region; a second labyrinth spaced from the first labyrinth and being presented toward but not contacting the sealing surface, the second labyrinth being configured to resist the movement of contaminants along the sealing surface; and a flexible dirt lip located between the first and second labyrinths and contacting the sealing surface.

2. The combination according to claim 1 wherein the first labyrinth contains pumping cavities, with each cavity opening out of the circumferentially extending face and the end face and being configured such that the lubricant which is in it is impelled back to the isolated region when relative rotation occurs between the sealing surface and the seal.

3. The combination according to claim 1 wherein the portion of the sealing surface toward which the second labyrinth is presented is located at an angle with respect to the portion of the sealing surface toward which the circumferentially extending face of the first labyrinth is presented.

4. The combination according to claim 1 wherein the portion of the sealing surface toward which the circumferentially extending face of the first labyrinth is presented extends generally axially and the portion of the sealing surface toward which the second labyrinth is presented extends generally radially.

5. The combination according to claim 4 wherein the sealing element further includes a flinger which is located raidally outwardly from the radial portion of the sealing surface and projects axially beyond that radial portion to deflect contaminants away from it.

6. The combination according to claim 1 wherein the second labyrinth creates a groove which opens toward the sealing surface.

7. The combination according to claim 6 wherein the second labyrinth includes two spaced apart ribs which project toward the sealing surface, and the groove is between the two ribs.

8. The combination according to claim 7 wherein the second labyrinth creates another groove with the dirt lip.

9. The combination according to claim 7 wherein a grease-type lubricant fills the groove and spans the space between the second labyrinth and the sealing surface.

10. The combination according to claim 1 wherein the sealing element is formed from a flexible material.

11. A seal for creating between two components, one of which rotates relative to the other about an axis of rotation, a barrier to the passage of a grease-type lubricant and contaminants, said seal having an axis that coincides with the axis of rotation when the seal is installed on one of the components, said seal comprising: a generally rigid seal case; a circular first labyrinth having a circumferentially extending face that is presented toward the axis of rotation and at least one end face that is located at an angle with respect to the circumferentially extending face; a circular second labyrinth carried by the seal case and being spaced from the first labyrinth, the second labyrinth having at least one groove that opens axially away from the first labyrinth; and a flexible dirt lip carried by the seal case and being located between first and second labyrinths, the dirt lip extending inwardly toward the axis of rotation, and having a contact face which, when the dirt lip is unrestrained, possesses a diameter less than the diameter of the circumferentially extending face of the first labyrinth.

12. A seal according to claim 11 wherein the first labyrinth has pumping cavities which open out of the end face and the circumferentially extending face, the cavities being bounded on their sides by side faces which intersect the circumferentially extending face along lines that are oblique to the end face.

13. A seal according to claim 11 wherein the second labyrinth includes a pair of ribs that are directed axially away from the first labyrinth, and the groove is between the ribs.

14. A seal according to claim 11 wherein the second labyrinth and dirt lip are configured and positioned such that another groove exists between them; and wherein both grooves open generally axially away from the first labyrinth.

15. A seal according to claim 11 wherein the dirt lip is oblique to the axis of rotation such that it is directed generally away from the first labyrinth.

16. A seal according to claim 11 wherein the first and second labyrinths and the dirt lip form part of a seal element which is bonded to the seal case, the seal element being formed from a flexible material.

17. The combination according to claim 16 wherein the dirt lip is oblique to and contacts the axial portion of the sealing surface.

18. The combination according to claim 17 wherein the groove of the secondary labyrinth is filled with the grease-type lubricant and the lubricant occupies the space between the secondary labyrinth and the radial portion of the sealing surface.

19. The combination according to claim 17 and further comprising a flinger attached to the seal case radially outwardly from the secondary labyrinth, the flinger projecting generally axially beyond the radial portion of the sealing surface so as to prevent contaminants from flowing along the sealing surface.

20. A seal according to claim 11 and further comprising a flinger carried by the seal case beyond the second labyrinth and projecting generally axially away from the seal case.

21. In combination with a pair of machine components which are arranged such that one will rotate relative to the other about an axis of rotation, the one component being hollow and the other component being received in the hollow component and carrying a sealing surface that has a generally axially directed portion and a generally radially directed portion, a seal for isolating within the hollow component a region that contains a grease-type lubricant, said seal comprising: a generally rigid seal case attached to the hollow component such that a static seal exists between the case and the hollow component; a primary labyrinth attached to the seal case and having a circumferentially extending face that is presented toward and surrounds the axial portion of the sealing surface, yet is spaced outwardly from the axial portion, and an end face that is presented toward and exposed to the isolated region; a secondary labyrinth attached to the seal case and presented toward, but being spaced from, the radial portion of the sealing surface, the secondary labyrinth having a groove which opens toward the radially directed portion of the sealing surface; and a flexible dirt lip attached to the seal case and being located between the primary and secondary labyrinths, the dirt lip being directed generally away from the primary labyrinth and contacting the sealing surface.

22. The combination according to claim 18 wherein the primary labyrinth has pumping cavities, each of which opens out of both the circumferentially extending face and the end face, each cavity on its sides being bounded by side faces which are oblique to the direction of relative rotation between the first labyrinth and the sealing surface and diverge toward the isolated region so that lubricant upon entering the cavity will be directed generally axially toward the isolated region.

23. The combination according to claim 20 wherein the primary and secondary labyrinths and the dirt lip are part of a seal element which is formed from a flexible substance and is bonded as a unit to the seal case.

* * * * *